(12) United States Patent
McCorkendale

(10) Patent No.: US 9,817,958 B1
(45) Date of Patent: Nov. 14, 2017

(54) SYSTEMS AND METHODS FOR AUTHENTICATING USERS

(71) Applicant: Symantec Corporation, Mountain View, CA (US)

(72) Inventor: Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/834,949

(22) Filed: Aug. 25, 2015

(51) Int. Cl.
*H04L 29/06* (2006.01)
*G06F 21/31* (2013.01)

(52) U.S. Cl.
CPC ............ *G06F 21/316* (2013.01); *H04L 63/20* (2013.01)

(58) Field of Classification Search
CPC ..... G06F 2221/2111; G06F 2221/2103; G06F 21/316
USPC .......................................................... 726/1
See application file for complete search history.

(56) References Cited

U.S. PATENT DOCUMENTS

| 8,316,421 | B2 * | 11/2012 | Etchegoyen | .......... G06F 21/121 709/217 |
| 8,925,037 | B2 | 12/2014 | Marino et al. | |
| 9,154,466 | B2 | 10/2015 | Sobel et al. | |
| 9,202,173 | B1 | 12/2015 | Dotan et al. | |
| 9,218,468 | B1 | 12/2015 | Rappaport | |
| 9,282,435 | B2 | 3/2016 | Ward et al. | |
| 2004/0153671 | A1 | 8/2004 | Schuyler et al. | |
| 2005/0097320 | A1 | 5/2005 | Golan et al. | |
| 2006/0031682 | A1 | 2/2006 | Sakai et al. | |
| 2006/0082439 | A1 | 4/2006 | Bazakos et al. | |
| 2006/0164282 | A1 | 7/2006 | Duff et al. | |
| 2010/0302143 | A1 | 12/2010 | Spivack | |
| 2010/0325712 | A1 | 12/2010 | Kakuta et al. | |
| 2011/0219423 | A1 | 9/2011 | Aad et al. | |
| 2011/0321143 | A1 | 12/2011 | Angaluri et al. | |
| 2012/0011559 | A1 | 1/2012 | Miettinen et al. | |
| 2012/0079576 | A1 * | 3/2012 | Han | ..................... G06F 21/316 726/7 |
| 2012/0246739 | A1 | 9/2012 | Mebed | |

(Continued)

FOREIGN PATENT DOCUMENTS

EP          1 703 431 A2     9/2006
JP        2007293062 A      11/2007

(Continued)

OTHER PUBLICATIONS

Abadi et al, Traffic Flow Predicition for Road Transporation Networks with Limited Traffic Data, IEEE, vol. 16, No. 2, Apr. 2015, pp. 653-662.*

(Continued)

*Primary Examiner* — Luu Pham
*Assistant Examiner* — Jenise Jackson
(74) *Attorney, Agent, or Firm* — FisherBroyles LLP

(57) ABSTRACT

The disclosed computer-implemented method for authenticating users may include (1) identifying at least one digital device with which a user interacts, (2) gathering information about how the user interacts with the digital device, (3) generating, based on the gathered information, an authentication protocol for authenticating the user, and (4) using the authentication protocol to authenticate the user. Various other methods, systems, and computer-readable media are also disclosed.

20 Claims, 10 Drawing Sheets

(56) References Cited

U.S. PATENT DOCUMENTS

| | | | |
|---|---|---|---|
| 2012/0331527 A1 | 12/2012 | Walters et al. | |
| 2013/0197998 A1 | 8/2013 | Buhrmann et al. | |
| 2013/0290201 A1 | 10/2013 | Rodriguez Carrillo | |
| 2013/0318580 A1* | 11/2013 | Gudlavenkatasiva | G06F 21/31 726/7 |
| 2014/0025485 A1* | 1/2014 | Niemeijer | G06Q 30/0242 705/14.45 |
| 2014/0040137 A1* | 2/2014 | Carlson | G06Q 20/02 705/44 |
| 2014/0123255 A1* | 5/2014 | Etchegoyen | G06F 21/44 726/7 |
| 2015/0324559 A1* | 11/2015 | Boss | H04L 63/20 726/1 |
| 2016/0057110 A1* | 2/2016 | Li | G06F 21/31 726/7 |
| 2016/0082926 A1 | 3/2016 | Mouser et al. | |
| 2016/0164922 A1* | 6/2016 | Boss | H04L 63/20 726/1 |
| 2016/0165650 A1* | 6/2016 | Kim | H04W 76/021 370/329 |
| 2016/0165651 A1* | 6/2016 | Pathuri | H04W 76/021 370/329 |
| 2016/0358441 A1* | 12/2016 | Mittleman | H04L 12/282 |

FOREIGN PATENT DOCUMENTS

| | | |
|---|---|---|
| JP | 2009140051 A | 6/2009 |
| JP | 2010128778 A | 5/2010 |

OTHER PUBLICATIONS

Baek et al, An Authentication Framework for Automatic Dependent Survelliance-Broadcast Based on Online/Offline Identity-Based Signature, IEEE, 2013, pp. 358-363.*

"Home—Good Security Questions", http://goodsecurityquestions.com/, as accessed Jun. 25, 2015, (Dec. 27, 2007).

Fake GPS Location app, https://play.google.com/store/apps/details?id=com.lexa.fakegps&hl=en, as accessed Feb. 23, 2017, Lexa Tools.

How SUPL Reveals My Identity and Location to Google When I Use GPS, http://mobilesociety.typepad.com/mobile_life/2014/08/supl-reveals-my-identity-and-location-to-google.html, published Aug. 31, 2014, Mobilesociety.

Assisted GPS, https://en.wikipedia.org/wiki/Assisted_GPS, as accessed Feb. 24, 2017, Wikipedia.

Lei Gu, et al; Systems and Methods for Enforcing Access-Control Policies; U.S. Appl. No. 15/194,403, filed Jun. 27, 2016.

HomeNews—WiFi can be used to count people with or without electronic gadgets; https://www.rt.com/news/266188-wifi-signal-human-density/; as accessed on Jun. 21, 2016; Jun. 10, 2015.

Ali et al.; Keystroke Recognition Using WiFi Signals; https://www.sigmobile.org/mobicom/2015/papers/p90-aliA.pdf; Sep. 7, 2015.

iRobot's Roomba 980 Maps Your Home Via Camera and Takes Smartphone Commands; http://blogs.wsj.com/personal-technology/2015/09/16/irobots-roomba-980-maps-your-home-via-camera-and-takes-smartphone-commands/; as accessed on Jun. 21, 2016; Sep. 16, 2015.

Microsoft Hololens; https://www.microsoft.com/microsoft-hololens/en-us; as accessed on Jun. 21, 2016.

Bruce McCorkendale, et al; Systems and Methods for Constructing a Volumetric Model of a Space from a Constellation of Sensing Devices; U.S. Appl. No. 14/833,655, filed Aug. 24, 2015.

Daniel Marino, et al; Systems and Methods for Enforcing Data-Loss-Prevention Policies Using Mobile Sensors; U.S. Appl. No. 13/733,131, filed Jan. 2, 2013.

Devicelock; Preventing Devastating Data Leaks by Securing the Endpoints of Your Network; http://www.devicelock.com/products/, as accessed on Sep. 10, 2012.

Konstantinos Kotis et al.; An ontology for the automated deployment of applications in heterogeneous IoT environments; http://www.semantic-web-journal.net/sites/default/files/swj247_0.pdf, as accessed Jun. 25, 2015; Semantic Web Journal; Feb. 13, 2012.

OMA Device Management; http://openmobilealliance.org/about-oma/work-program/device-management/, as accessed Jun. 25, 2015; Jan. 15, 2013.

Open Mobile Alliance (OMA); http://openmobilealliance.org/, as accessed Jun. 25, 2015; Aug. 2, 2002.

OpenHAB; http://www.openhab.org/, as accessed Jun. 25, 2015; Jul. 11, 2011.

Daniel Siewiorek; SenSay: A Context-Aware Mobile Phone; Human Computer Interaction and Institute for Complex Engineered Systems; As accessed on Sep. 10, 2012.

Megan Treacy; 10 environmental sensors that go along with you; http://www.treehugger.com/clean-technology/environmental-sensors.html, as accessed Jun. 25, 2015; Mar. 5, 2013.

Zenprise; Mobile DLP (Data Leakage Prevention); http://www.zenprise.com/solutions/mobile-data-leakage-prevention/, as accessed on Sep. 10, 2012.

Alastair R. Beresford et al., MockDroid: trading privacy application functionality on smartphones; Proceedings of the 12th Workshop on Mobile Computing Systems and Applications, HotMobile '11, Phoenix, Arizona, Mar. 1-3, 2011.

Jason Franklin et al.; Passive Data Link Layer 802.11 Wireless Device Driver Fingerprinting; Proceedings of USENIX Security '06, Jul. 31-Aug. 4, 2006, Vancouver, BC, Canada.

School of Privacy, Guide on How to be Safe, Secure and Protect Your Online Anonymity; Fake GPS Location—Android; http://school-of-privacy.com/post/70381068300/fake-gps-location-andoid; Dec. 18, 2013.

SensorSimulator; https://code.google.com/p/openintents/wiki/SensorSimulator; Jan. 12, 2013.

William E. Sobel, et al.; Systems and Methods for Introducing Variation in Sub-System Output Signals to Prevent Device Fingerprinting; U.S. Appl. No. 14/139,824, filed Dec. 23, 2013.

C. Rigney et al; Remote Authentication Dial in User Service (RADIUS); https://tools.ietf.org/html/rfc2865, as accessed Nov. 6, 2015; Request for Comments: 2865; Jun. 2000.

C. Neuman et al; The Kerberos Network Authentication Service (V5); https://tools.ietf.org/html/rfc4120, as accessed Nov. 6, 2015; Request for Comments: 4120; Jul. 2005.

Kerberos: The Network Authentication Protocol; http://web.mit.edu/kerberos/, as accessed Nov. 6, 2016; Jan. 28, 1999.

Microsoft Negotiate; https://msdn.microsoft.com/en-us/library/windows/desktop/aa378748(v=vs.85).aspx. as accessed Nov. 6, 2015; Nov. 13, 2011.

Microsoft NTLM; https://msdn.microsoft.com/en-us/library/windows/desktop/aa378749(v=vs.85).aspx, as accessed Nov. 6, 2015; Nov. 12, 2011.

Prasad Bokare, et al; Systems and Methods for Facilitating Single Sign-On for Multiple Devices; U.S. Appl. No. 15/041,040, filed Feb. 11, 2016.

Symantec Identity Access Manager; https://www.symantec.com/identity-access-manager/, as accessed Nov. 6, 2015; Symantec Corporation; Nov. 7, 2014.

Symantec Validation and ID Protection Service; http://www.symantec.com/vip-authentication-service/, as accessed Nov. 6, 2015; Symantec Corporation; Feb. 10, 2014.

Ramakrishnan Meenakshi Sundaram; Systems and Methods for Managing Smart Building Systems; U.S. Appl. No. 15/041,002, filed Feb. 10, 2016.

ZigBee Alliance, http://www.zigbee.org/, as accessed Dec. 14, 2015, (Nov. 14, 2001).

Z-Wave, http://www.z-wave.com/, as accessed Dec. 14, 2015, (Dec. 23, 2002).

OMA Device Management Working Group, http://openmobilealliance.org/about-oma/work-program/device-management/, as accessed Dec. 14, 2015, (Jan. 15, 2013).

Lei Gu, et al; Systems and Methods for Enforcing Access-Control Policies in an Arbitrary Physical Space; U.S. Appl. No. 15/195,677, filed Jun. 28, 2016.

(56) References Cited

OTHER PUBLICATIONS

Kevin Jiang, et al; Systems and Methods for Using Vehicles as Information Sources for Knowledge-Based Authentication; U.S. Appl. No. 14/979,620, filed Dec. 28, 2015.
Snapshot; https://www.progressive.com/auto/snapshot/, as accessed Nov. 18, 2015; Progressive Casualty Insurance Company; On or before Nov. 18, 2015.
FasTrak; https://www.bayareafastrak.org/en/howitworks/gettingstarted.shtml, as accessed Nov. 18, 2015; On or before Nov. 18, 2015.
Ilya Sokolov, et al; Systems and Methods for Verifying User Attributes; U.S. Appl. No. 14/985,675, filed Dec. 31, 2015.
E-ZPass, https://www.e-zpassny.com/en/home/index.shtml, as accessed Nov. 18, 2015, (On or before Nov. 18, 2015).
Fastpass, https://disneyland.disney.go.com/guest-services/fastpass/, as accessed Nov. 18, 2015, Disney, (On or before Nov. 18, 2015).
Toll Payment Options at the Golden Gate Bridge, http://www.goldengate.org/tolls/tollpaymentoptions.php, as accessed Nov. 18, 2015, (On or before Nov. 18, 2015).
OnStar, https://www.onstar.com/us/en/home.html, as accessed Nov. 18, 2015, (On or before Nov. 18, 2015).
BMW Assist, http://www.bmwusa.com/Standard/Content/Explore/BMWValue/BMWAssist/default.aspx, as accessed Nov. 18, 2015, (On or before Nov. 18, 2015).
Department of Motor Vehicles, https://www.dmv.ca.gov/portal/dmv, as accessed Nov. 18, 2015, (On or before Nov. 18, 2015).
Ilya Sokolov, et al; Systems and Methods for Evaluating Identity Intensity; U.S. Appl. No. 15/057,618, filed Mar. 1, 2016.
Evgenios Kornaropoulos, et al; Systems and Methods for Securely Detecting Data Similarities; U.S. Appl. No. 14/871,868, filed Sep. 30, 2015.
Symantec VIP Intelligent Authentication, http://www.symantec.com/content/en/us/enterprise/fact_sheets/b-vip_intelligent_authentication_DS_21213685.en-us.pdf, as accessed Jan. 13, 2016, Data Sheet: Authentication, Symantec Corporation, (Oct. 2011).
Ilya Sokolov et al; Systems and Methods for Certifying Geolocation Coordinates of Computing Devices; U.S. Appl. No. 15/466,156, filed Mar. 22, 2017.
Ilya Sokolov et al.; Systems and Methods for Securely Sharing Cloud-Service Credentials Within a Network of Computing Devices; U.S. Appl. No. 15/276,105, filed Sep. 26, 2016.
Amazon Echo, Nov. 6, 2014: https://en.wikipedia.org/wiki/Amazon_Echo.
Google Home, announced May 18, 2016: https://en.wikipedia.org/wiki/Google_Home.
Secret sharing, as accessed on Sep. 13, 2016: https://en.wikipedia.org/wiki/Secret_sharing.
Norton Identity Safe, announced Aug. 28, 2007: https://identitysafe.norton.com/.

* cited by examiner

```
                              Information
                                  122
-----------------------------------------------------------------------
***********************************************
DEVICE: AMAZON KINDLE PAPERWHITE (MAC ADDRESS: 00-14-22-01-23-45)
TIMESTAMP: 2015-04-30 15:45 UTC
USER INTERACTION: Accessed MOBY DICK
***********************************************
-----------------------------------------------------------------------
***********************************************
 DEVICE: SAMSUNG LED SMART HDTV (MAC ADDRESS: d0:45:6b:a5:14:87)
 TIMESTAMP: 2015-04-30 22:30
 USER INTERACTION: Accessed CASABLANCA via NETFLIX
***********************************************
-----------------------------------------------------------------------
***********************************************
 DEVICE: KEYPADLINC GARAGE DOOR SWITCH (MAC ADDRESS: 94-33-42-44-23-a3)
 TIMESTAMP: 2015-04-31 6:28
 USER INTERACTION: Instructed KEYPADLINC garage door switch to open garage door by submitting an
 instruction from KEYPADLINC application running on iPHONE 5S
***********************************************
-----------------------------------------------------------------------
***********************************************
 DEVICE: iSMARTALARM WIRELESS MOTION SENSOR (MAC ADDRESS: e3-23-d6-d0-33-21)
 USER INTERACTION: No motion detected from 2014-06-06 06:30 to 2014-06-10 22:02
***********************************************
-----------------------------------------------------------------------
***********************************************
 DEVICE: MR. COFFEE SMART OPTIMAL BREW (MAC ADDRESS: 09:29:06:60:43:56)
 TIMESTAMP: 2015-04-31 05:32
 USER INTERACTION: Brewed coffee
***********************************************
-----------------------------------------------------------------------
 DEVICE: FITBIT SURGE (MAC ADDRESS: 00:49:09:61:22:0e)
 TIMESTAMP: 2014-04-31 22:30
 USER INTERACTION: Took 1,200 steps while wearing device
***********************************************
-----------------------------------------------------------------------
```

*FIG. 6*

Security Questions
700

DATE: APRIL 31, 2015
---
****************************************

QUESTION ONE
Which of the following activities did you do yesterday afternoon?:
A) Made coffee on a smart coffee maker
B) Read ALICE IN WONDERLAND on a NEXUS phone
C) Read MOBY DICK on a KINDLE device
D) Drove to Alexandria
****************************************
---
****************************************

QUESTION TWO
Did you watch a film last night? If so, which one?

****************************************
---
****************************************

QUESTION THREE
What time did you leave for work yesterday?:
A) Between 6:00 and 6:30
B) Between 7:30 and 8:00
C) Between 8:30 and 9:00
D) Between 5:00 and 5:30

****************************************
---
****************************************

QUESTION FOUR
When was the last time your entire family was gone overnight from the home?
A) January 10, 2014
B) March 11, 2015
C) June 15, 2014
D) May 3, 2013
****************************************
---
****************************************

QUESTION FIVE
How many steps did you walk yesterday?

SYSTEMS AND METHODS FOR AUTHENTICATING USERS

BACKGROUND

Many services require users to complete an authentication process before allowing users to access, use, and/or modify user accounts. For example, an online service may require a user to demonstrate that he or she knows a "shared secret" (i.e., a "secret" known by both the user and the service). In some examples, the shared secret may be a password. In other examples, the shared secret may be information about the user, such as the user's birthplace, the maiden name of the user's mother, or the name of the user's first pet. In these examples, the service may authenticate an individual purporting to be the user if the individual demonstrates that he or she knows the shared secret.

Unfortunately, shared secrets may be ineffective if they are based on information (e.g., a birthplace) that is publically available (e.g., from public records or social media) or easily obtained by unauthorized users. Similarly, passwords may be difficult for a user to remember and/or may be stolen or guessed by unauthorized users using brute force. Accordingly, the instant disclosure identifies a need for improved systems and methods for authenticating users.

SUMMARY

As will be described in greater detail below, the instant disclosure describes various systems and methods for authenticating a user based on information gathered from one or more devices with which the user interacts, resulting in a shared secret that is known by the user but that is not based on publically available information and/or easily guessed using brute force. In one example, a computer-implemented method for performing such a task may include (1) identifying at least one digital device with which a user interacts, (2) gathering information about how the user interacts with the digital device, (3) generating, based on the gathered information, an authentication protocol for authenticating the user, and (4) using the authentication protocol to authenticate the user.

The digital device may take a variety of forms, such as a computing device, a smart appliance, and/or a sensing device. In some examples, the method may further include gathering information that identifies digital content accessed by the digital device, application content generated by the digital device, and/or sensor data generated by the digital device. In one embodiment, the method may also include gathering the information from at least one networking device to which the digital device is connected. In some examples, the method may further include identifying, by analyzing network traffic generated by the digital device, the digital device, the user, digital content accessed by the digital device, and/or application content accessed by the digital device. In one embodiment, the method may further include using a cloud-based service to aggregate the gathered information.

In one embodiment, the method may further include generating both a security question and a correct answer to the security question that are based on the gathered information. In this example, the method may also include creating a policy that prescribes authenticating the user if the user, in response to being presented with the security question, provides an answer that matches the correct answer. The method may further include (1) presenting the security question to the user, (2) receiving an answer to the security question from the user, (3) determining that the answer received from the user matches the correct answer, and (4) authenticating the user in response to determining that the answer received from the user matches the correct answer.

In some embodiments, the method may also include using the authentication protocol as part of, and/or providing the authentication protocol to, an identity service and/or an online service. In one example, the method may further include using the authentication protocol as a primary authentication factor and/or a secondary authentication factor.

In one embodiment, the method may further include identifying an additional digital device with which the user and/or the digital device interacts. In this embodiment, the method may also include, upon identifying the additional digital device, creating a digital fingerprint for the user that is based on both the digital device and the additional digital device. The method may further include creating a policy that prescribes authenticating the user if devices being used by the user at the current moment in time match the digital fingerprint. In some examples, the digital fingerprint may be further based on network activity of the user and/or the location of the digital device and/or the additional digital device.

In one embodiment, a system for implementing the above-described method may include (1) an identification module, stored in memory, that identifies at least one digital device with which a user interacts, (2) a gathering module, stored in memory, that gathers information about how the user interacts with the digital device, (3) a generating module, stored in memory, that generates, based on the gathered information, an authentication protocol for authenticating the user, (4) an authentication module, stored in memory, that uses the authentication protocol to authenticate the user, and (5) at least one physical processor configured to execute the identification module, the gathering module, the generating module, and the authentication module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify at least one digital device with which a user interacts, (2) gather information about how the user interacts with the digital device, (3) generate, based on the gathered information, an authentication protocol for authenticating the user, and (4) use the authentication protocol to authenticate the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is an illustration of exemplary information about how a user interacts with digital devices.

FIG. 7 is an illustration of exemplary security questions that may be used to authenticate a user.

Figure 1:
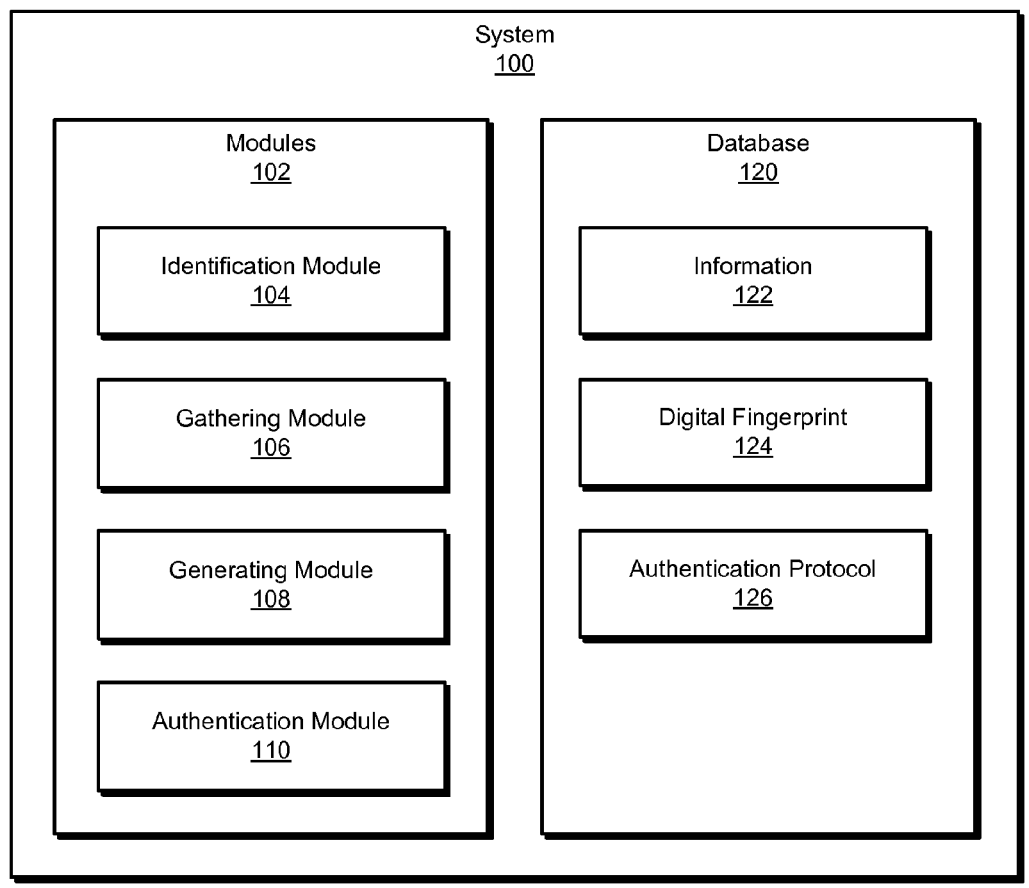
FIG. 1 is a block diagram of an exemplary system for authenticating users.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for authenticating a user based on information gathered from the various devices (e.g., mobile phones and other computing devices, smart appliances, sensing devices, etc.) with which the user interacts on a daily basis. As will be explained in greater detail below, by authenticating a user based on information about how the user interacts with such devices, the disclosed systems and methods may effectively authenticate the user based on information that is both easily known by the user and verifiable by an identity provider, but not easily discovered by unauthorized entities.

The following will provide, with reference to FIGS. 1-2 and 4-8, detailed descriptions of exemplary systems for authenticating users. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 9 and 10, respectively.

FIG. 1 is a block diagram of exemplary system 100 for authenticating users. As illustrated in this figure, exemplary system 100 may include one or more modules 102 for performing one or more tasks. For example, and as will be explained in greater detail below, exemplary system 100 may include an identification module 104 that may identify at least one digital device with which a user interacts. Exemplary system 100 may additionally include a gathering module 106 that may gather information about how the user interacts with the digital device. Exemplary system 100 may also include a generating module 108 that may generate, based on the gathered information, an authentication protocol for authenticating the user. Exemplary system 100 may additionally include an authentication module 110 that may use the authentication protocol to authenticate the user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., digital device 202 and/or backend 206), computing system 910 in FIG. 9, and/or portions of exemplary network architecture 1000 in FIG. 10. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store information 122 about how a user interacts with digital devices, a digital fingerprint 124 that identifies the typical devices with which a user interacts, and an authentication protocol 126 for authenticating one or more users. Database 120 may represent portions of a single database or computing device or a plurality of databases or computing devices. For example, database 120 may represent a portion of digital device 202 and/or backend 206 in FIG. 2, computing system 910 in FIG. 9, and/or portions of exemplary network architecture 1000 in FIG. 10. Alternatively, database 120 in FIG. 1 may represent one or more physically separate devices capable of being accessed by a computing device, such as digital device 202 and/or backend 206 in FIG. 2, computing system 910 in FIG. 9, and/or portions of exemplary network architecture 1000 in FIG. 10.

Figure 2:
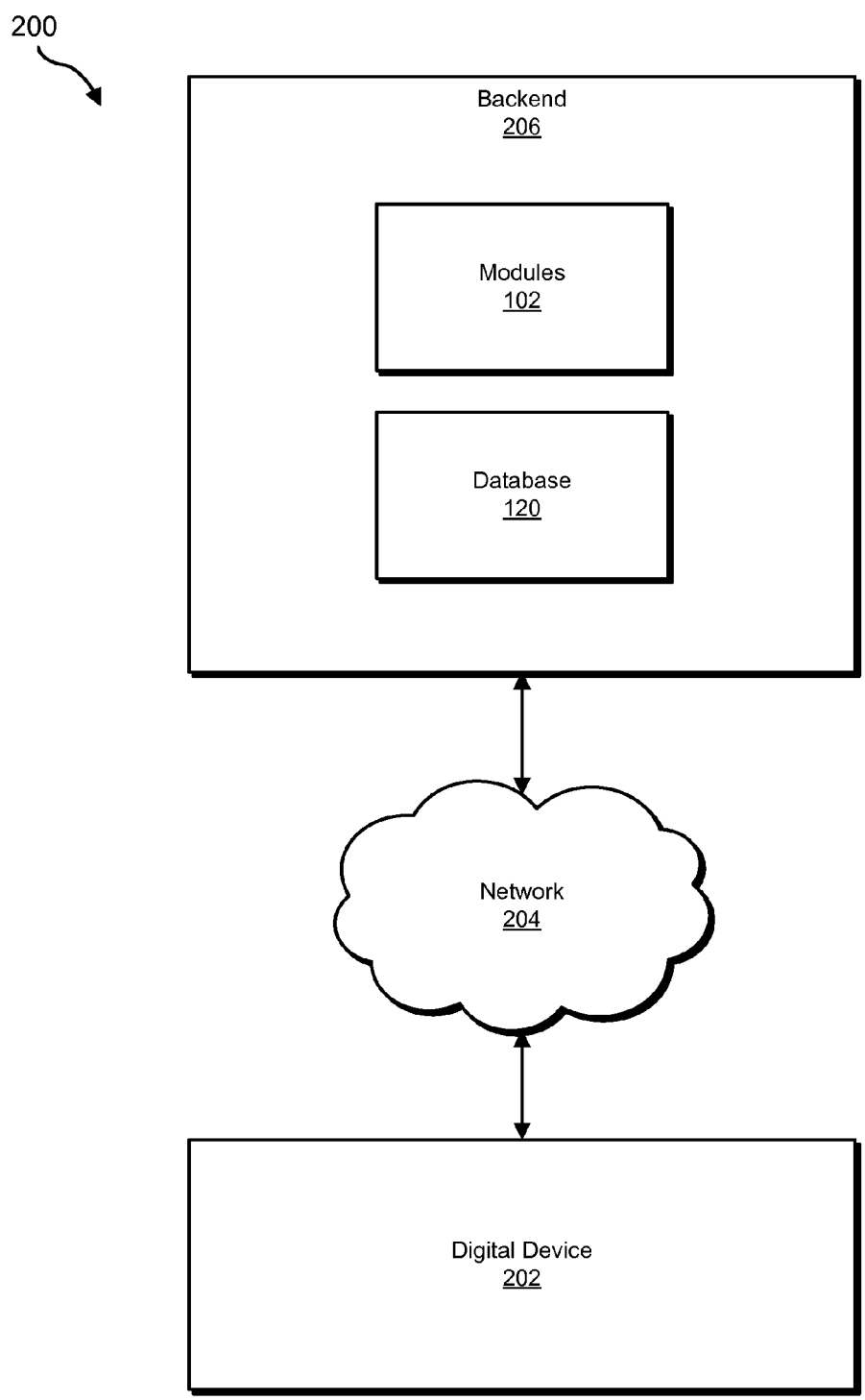
FIG. 2 is a block diagram of an additional exemplary system for authenticating users.

Exemplary system 100 in FIG. 1 may be implemented in a variety of ways. For example, all or a portion of exemplary system 100 may represent portions of exemplary system 200 in FIG. 2. As shown in FIG. 2, system 200 may include a digital device 202 in communication with a backend 206 via a network 204. In one example, digital device 202 may be programmed with one or more of modules 102 and/or may store all or a portion of the data in database 120. Additionally or alternatively, backend 206 may be programmed with one or more of modules 102 and/or may store all or a portion of the data in database 120.

In one embodiment, one or more of modules 102 from FIG. 1 may, when executed by at least one processor of digital device 202 and/or backend 206, enable digital device 202 and/or backend 206 to authenticate users. For example, and as will be described in greater detail below, identification module 104 may identify digital device 202. Gathering module 106 may then gather information 122 about how a user interacts with digital device 202. In response, generating module 108 may generate, based on information 122, an authentication protocol 126 for authenticating the user. Authentication module 110 may then use authentication protocol 126 to authenticate the user.

Figure 9:
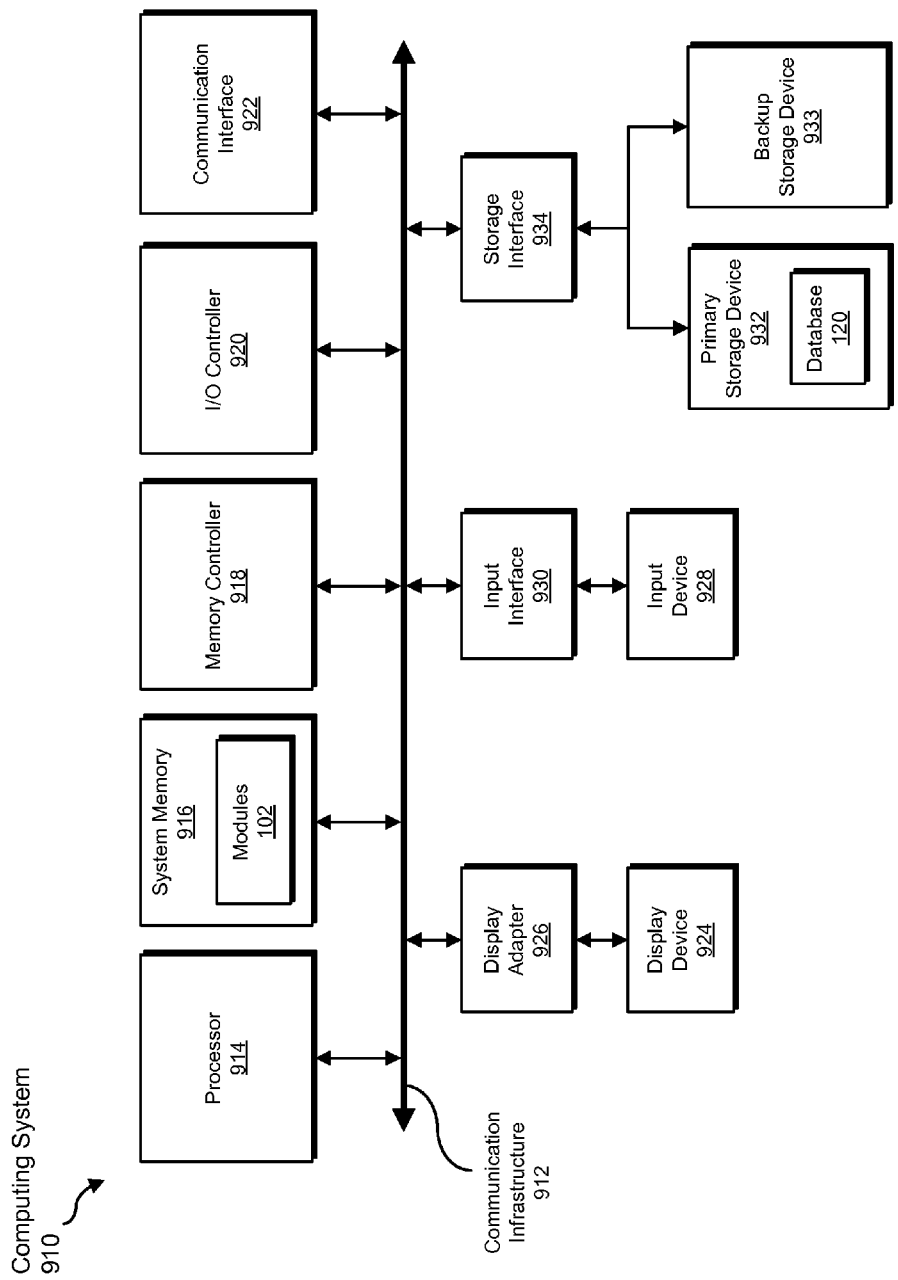
FIG. 9 is a block diagram of an exemplary computing system capable of implementing one or more of the embodiments described and/or illustrated herein.

Digital device 202 generally represents any type or form of computing device capable of reading computer-executable instructions, such as exemplary computing system 910 in FIG. 9. In one embodiment, digital device 202 may refer to a device that is used by, or otherwise associated with, a user. In some examples, digital device 202 may represent a computing device, including, without limitation, a laptop, a tablet, a desktop, a server, a cell phone, a Personal Digital Assistant (PDA), a multimedia player, and/or an embedded system. In other examples, digital device 202 may represent a wearable device, such as a smart watch, smart glasses, and/or a pedometer. Additionally or alternatively, digital device 202 may represent a sensing device. As used herein, the term "sensing device" generally refers to any device with a sensor, such as a thermostat, a wearable device with an accelerometer, a GPS device, a garage door sensor, a house door sensor, a light sensor, a light switch sensor, a motion detector, a window sensor, a humidity sensor, a sound sensor, etc. Additionally or alternatively, digital device 202 may refer to a smart appliance. As used herein, the term "smart appliance" generally refers to any appliance (e.g., a home or office appliance) that performs a task on behalf of a user and has at least one computing function. For example, a smart appliance may refer to an appliance that a user may program remotely and/or control remotely, such as a smart fridge, a smart coffee maker, a smart toaster, a gaming console, a smart TV, a smart switch, a smart light, etc.

Backend 206 generally represents any type or form of computing device that is capable of authenticating users. Examples of backend 206 include, without limitation, application servers and database servers configured to provide various database services and/or run certain software applications. In some examples, backend 206 may refer to a cloud-based service. In one embodiment, backend 206 may operate as part of an online service (e.g., an email service, a social-networking platform, a bank website, etc.) and/or an identity authentication service. Additionally or alternatively, backend 206 may provide authentication protocols to an online service and/or an identity authentication service, as explained in greater detail below.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1000 in FIG. 10, or the like. Network 204 may facilitate communication or data transfer using wireless or wired connections. In one embodiment, network 204 may facilitate communication between digital device 202 and backend 206.

Figure 3:
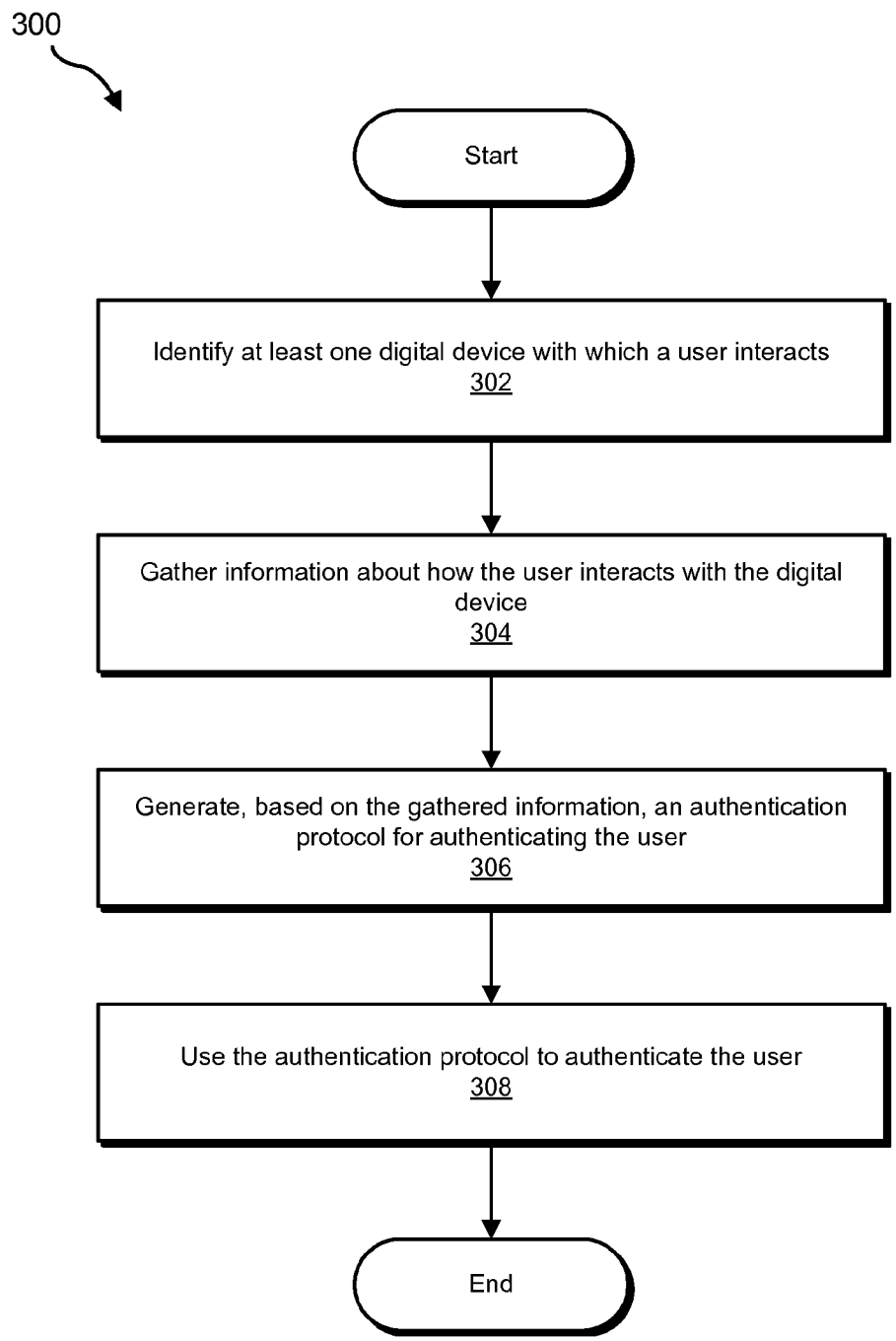
FIG. 3 is a flow diagram of an exemplary method for authenticating users.

FIG. 3 is a flow diagram of an exemplary computer-implemented method 300 for authenticating users. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 910 in FIG. 9, and/or portions of exemplary network architecture 1000 in FIG. 10.

As illustrated in FIG. 3, at step 302, one or more of the systems described herein may identify at least one digital device with which a user interacts. For example, identification module 104 may, as part of backend 206 in FIG. 2, identify digital device 202.

Identification module 104 may identify digital device 202 in a variety of ways. In one example, identification module 104 may (e.g., as part of a registration process) have asked the user to provide a list of devices with which the user interacts. In this example, identification module 104 may identify digital device 202 based on the user's response.

In another example, identification module 104 may identify digital device 202 based on information received directly from digital device 202. For example, a module installed on digital device 202 may (e.g., as part of a registration process) transmit information that identifies digital device 202 to identification module 104. Additionally or alternatively, identification module 104 may identify digital device 202 based on information received from another device. For example, digital device 202 may be connected to a local network (e.g., a home or office network) that is managed by a networking device, such as a router, that directs traffic on the network. In this example, identification module 104 may identify, as part of this networking device, each of the devices (including digital device 202) that are connected to this local network. For example, identification module 104 may automatically identify and build a comprehensive list of the devices with which a user interacts (including digital device 202) simply by monitoring and analyzing the network traffic generated by these devices. Identification module 104 may identify devices based on a variety of characteristics, including, for example, MAC addresses, IP addresses, manufacturer names (based on, e.g., registered identification numbers), device brands and/or versions, etc.

Identification module 104 may also identify digital device 202 in response to a variety of events. For example, identification module 104 may identify digital device 202 in response to determining that a user of digital device 202 is attempting to complete an online task that requires the user to be authenticated (e.g., access an account, change a password, modify an account setting, etc.). In some examples, identification module 104 may operate as part of a third-party identity proofing service. In these examples, identification module 104 may identify digital device 202 in response to receiving a request to authenticate the user from an online service. Additionally or alternatively, identification module 104 may identify digital device 202 in response to receiving a request for authentication from the user.

At step 304, one or more of the systems described herein may gather information about how the user interacts with the digital device. For example, gathering module 106 may, as part of backend 206 in FIG. 2, gather information 122 about how the user interacts with digital device 202.

Figure 4:
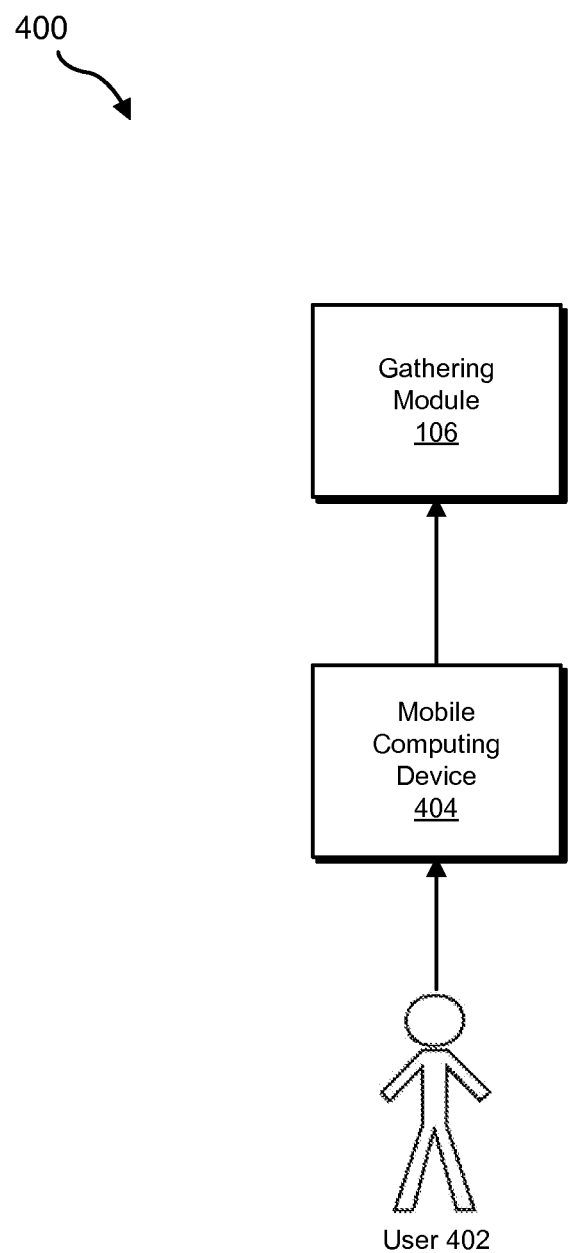
FIG. 4 is a block diagram of an exemplary computing system for gathering information about how a user interacts with one or more digital devices.

Gathering module 106 may gather information 122 in a variety of ways. In one example, gathering module 106 may gather information 122 directly from digital device 202. For example, as illustrated in FIG. 4, a user 402 may interact with a mobile computing device 404 and gathering module 106 may gather information about how user 402 interacts with mobile computing device 404 directly from mobile computing device 404.

Figure 5:
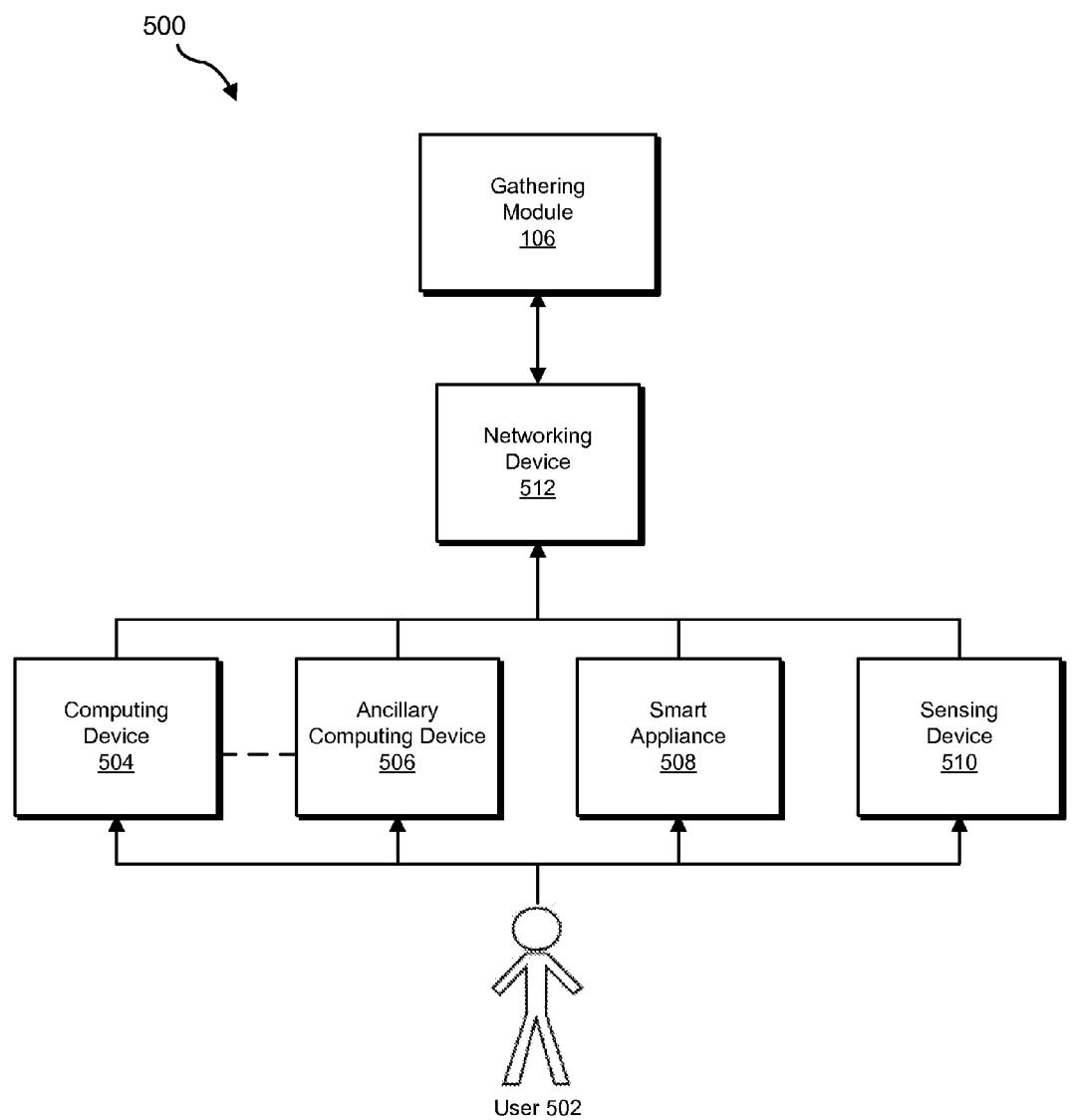
FIG. 5 is a block diagram of an additional exemplary computing system for gathering information about how a user interacts with one or more digital devices.

In another example, gathering module 106 may gather information 122 from at least one networking device (such as a router or smart router) to which digital device 202 is connected. For example, as illustrated in FIG. 5, gathering module 106 may gather information about how a user 502 interacts with one or more digital devices from a networking device 512.

In some examples, networking device 512 may support a constellation of different devices with which the user interacts. In these examples, gathering module 106 may efficiently obtain information from one source (i.e., networking device 512) about how the user interacts with multiple digital devices. For example, as shown in FIG. 5, networking device 512 may support a computing device 504, an ancillary device 506 that works in tandem with computing device 504, a smart appliance 508, and a sensing device 510.

In this example, gathering module 106 may gather information about how user 502 interacts with any of these devices by extracting data from networking device 512.

Gathering module 106 may determine that an interaction with digital device 202 is an interaction performed by the user in a variety of ways. In some examples, gathering module 106 may assume that any interaction with digital device 202 was conducted by the user (e.g., based on the user having supplied information about digital device 202 during a registration process). In other examples, gathering module 106 may determine that an interaction with digital device 202 was performed by the user based on usage patterns (e.g., previous websites visited by the user, login times, devices used, etc.).

The types of information that gathering module 106 may gather are many. In some examples, gathering module 106 may gather sensor data generated by digital device 202. For example, in embodiments where digital device 202 represents a mobile phone, gathering module 106 may gather GPS data from the mobile phone. As another example, in embodiments where digital device 202 represents a wearable fitness tracker (e.g., a fitness tracking watch), gathering module 106 may gather fitness data tracked using accelerometers on the wearable fitness tracker. As another example, in embodiments where digital device 202 represents a smart-home appliance, gathering module 106 may gather information about how the user interacts with the smart-home appliance. For example, gathering module 106 may gather temperature data collected by a smart thermostat, records of doors being opened or closed collected by a smart door lock or door motion sensor, records of lights being turned on or off collected by a smart light switch, motion data collected by a home alarm system, etc.

In other examples, gathering module 106 may gather information from a system that analyzes data from digital device 202 in order to make predictions. For example, gathering module 106 may gather information from a machine-learning automation convenience feature within a smart-home system that predicts when a particular smart-home device should complete a task so as to instruct the smart-home device to automatically complete the task at the predicted time.

In other examples, gathering module 106 may gather digital content accessed by digital device 202. For example, gathering module 106 may identify websites visited by the user via digital device 202, movies watched by the user via digital device 202, songs played by the user via digital device 202, etc. In one embodiment, gathering module 106 may identify content (e.g., a website) accessed by digital device 202 by monitoring content identified by security software (such as NORTON COMMUNITY WATCH) running on digital device 202.

In other examples, gathering module 106 may gather application content generated by digital device 202. For example, gathering module 106 may gather content created by the user in an email application running on digital device 202, a calendar application running on digital device 202, or a social-networking account running on digital device 202. In some examples, gathering module 106 may receive permission from the user to access the application content prior to gathering the application content. For example, gathering module 106 may gather application content from sources that the user has indicated he or she wishes to share with an identity service associated with gathering module 106.

In other examples, gathering module 106 may gather application content accessed by digital device 202. For example, gathering module 106 may identify which applications or application versions digital device 202 has accessed, the functionality of the accessed applications that was used, etc.

In other examples, gathering module 106 may gather information about one or more additional digital devices with which the user and/or digital device 202 interacts. Gathering module 106 may gather information about the additional devices in a variety of ways. For example, gathering module 106 may identify a network (such as network 204) to which digital device 202 is connected. In this example, gathering module 106 may gather information about additional devices that connect to the same network. As another example, gathering module 106 may identify a networking device that supports digital device 202. In this example, gathering module 106 may gather information about additional devices that are supported by the networking device. In some examples, gathering module 106 may additionally identify associations between digital device 202 and the one or more additional devices. For example, gathering module 106 may identify an auxiliary device, such as a Bluetooth device, and determine that the auxiliary device is connected to and/or used in connection with digital device 202.

FIG. 6 provides a specific example of the kind of information that may be included in information 122. As shown in FIG. 6, information 122 may provide information about how the user interacts with a tablet device, a smart TV device, a smart garage door, a motion sensor, a smart coffeemaker, and a wearable fitness device. In this specific example, information 122 indicates that (1) the user accessed the novel "MOBY DICK" via an AMAZON KINDLE at 15:45 on Apr. 30, 2015, (2) the user accessed the film "CASABLANCA" via NETFLIX on a SAMSUNG smart TV at 22:30 on Apr. 30, 2015, (3) the user submitted an instruction from a mobile phone for a KEYPADLINC garage door opener to open the user's garage door at 6:28 on Apr. 31, 2015, (4) an iSMARTALARM motion sensor did not detect any motion from Jun. 6, 2014 at 6:30 until Jun. 10, 2014 at 22:02, (5) the user used a MR. COFFEE smart coffeemaker to brew coffee at 5:32 on Apr. 31, 2015, and (6) the user took 1,200 steps while wearing a FITBIT SURGE on Apr. 30, 2014.

After obtaining information 122, gathering module 106 may deduce information about the day-to-day life of the user based on information 122. For example, based on the information illustrated in FIG. 6, gathering module 106 may deduce that (1) the user read from the novel "MOBY DICK" using his or her AMAZON KINDLE on Apr. 30, 2015 in the afternoon, (2) the user watched the film "CASABLANCA" via NETFLIX on his or her SAMSUNG smart TV on Apr. 30, 2015 before going to bed, (3) the user left his or her house at 6:28 on Apr. 31, 2015, (4) the user and his or her family were on vacation from Jun. 6, 2014 until Jun. 10, 2014, (5) the user had coffee in the morning on Apr. 31, 2015, and (6) the user took 1,200 steps on Apr. 30, 2014.

In some examples, gathering module 106 may infer information about one user event from information collected and aggregated from multiple devices. For example, gathering module 106 may gather information from a garage door sensor, a smart light switch, a motion detector, and a mobile phone with GPS. In this example, gathering module 106 may have obtained information from the garage door sensor about the time at which the garage door was opened on a particular day, information from the smart light switch about the time at which lights were turned on and off on the particular day, information from the motion detector about the times at which there was activity within the house on the particular day, and information from the GPS of the mobile phone about the location of the user on the particular day. Thus, by gathering all of this information from various digital devices, gathering module 106 may deduce the times during which the user was home on the day in question.

In some examples, information 122 may be aggregated and/or analyzed at a cloud-based service. For example, gathering module 106 may operate as part of a cloud-based service that provides identity proofing services. In this example, gathering module 106 may collect information 122 (e.g., from a digital device and/or a networking device connected to the digital device) and aggregate and analyze information 122 on site at the cloud-based service. In one example, information 122 may be received (e.g., from the digital device and/or the networking device) all at once. In other examples, information 122 may be obtained incrementally over time. In this example, gathering module 106 may be in continual communication with the digital device and/or the networking device, or gathering module 106 may communicate with the digital device and/or the networking device at discrete intervals.

As will be explained in greater detail below, information 122 may be used as the basis for a shared secret between the user and an authentication service. In other words, information 122 may represent information that (1) is known to the user and, after being gathered, is known to an authentication service associated with gathering module 106, but that (2) is unlikely to be known by an attacker.

Returning to FIG. 3, at step 306, one or more of the systems described herein may generate, based on the gathered information, an authentication protocol for authenticating the user. For example, generating module 108 may, as part of backend 206 in FIG. 2, generate, based on information 122, authentication protocol 126 for authenticating the user.

Generating module 108 may generate authentication protocol 126 in a variety of ways. In one example, generating module 108 may generate one or more security questions that are based on information 122. In this example, generating module 108 may also designate correct answers to the security questions that are also based on information 122.

The types of security questions that generating module 108 may generate are vast and varied. FIG. 7 gives five specific examples of security questions (i.e., security questions 700) that generating module 108 may generate for a specific date (e.g., Apr. 31, 2015) based on the information provided in FIG. 6. Each specific example will now be discussed, in turn.

First, "Question One" in FIG. 7 asks the user "Which of the following activities did you do this afternoon?" and gives four choices as potential answers: (A) "Made coffee on a smart coffee maker," (B) "Read ALICE IN WONDERLAND on a NEXUS phone," (C) "Read MOBY DICK on a KINDLE device," or (D) "Drove to Alexandria." In this example, the correct answer (C) is based on the information in FIG. 6 that indicates that the user accessed the novel "MOBY DICK" via a KINDLE device at 15:45 on Apr. 30, 2015.

Second, "Question Two" in FIG. 7 asks the user "Did you watch a film last night? If so, which one?" In this example, the correct answer (CASABLANCA) is based on the information in FIG. 6 that indicates that the user accessed the film "CASABLANCA" via NETFLIX on a SAMSUNG smart TV at 22:30 on Apr. 30, 2015.

Third, "Question Three" in FIG. 7 asks the user "What time did you get home from work yesterday?" and gives four choices as potential answers: (A) "Between 6:00 and 6:30," (B) "Between 7:30 and 8:00," (C) "Between 8:30 and 9:00," and (D) "Between 5:00 and 5:30." In this example, the correct answer (A) is based on the information in FIG. 6 that indicates that the user submitted an instruction from a mobile phone for a KEYPADLINC garage door opener to open a garage door at 6:28 on Apr. 31, 2015.

Fourth, "Question Four" in FIG. 7 asks the user "When was the last time your entire family was gone overnight from the home?" and gives four choices: (A) "Jan. 10, 2014," (B) "Mar. 11, 2015," (C) "Jun. 15, 2014," and (D) "May 3, 2013." In this example, the correct answer (C) is based on the information in FIG. 6 that indicates that the iSMARTALARM motion sensor did not detect any motion from Jun. 6, 2014 at 6:30 until Jun. 10, 2014 at 22:02.

Fifth, "Question Five" in FIG. 7 asks the user "How many steps did you walk yesterday?" In this example, the correct answer (1,200 steps) is based on the information in FIG. 6 that indicates that the user took 1,200 steps while wearing a FITBIT SURGE on Apr. 30, 2014.

Other examples of security questions may include, without limitation, "Were you the first person to leave this morning?," "Were you the last person to leave this morning?," "What is your usual departure time on weekdays?," "How do you usually enter/leave the house (e.g. garage, front door, side door, etc.)?," "How long was you last workout?," "What type of workout was your last workout?," "Which of the following news stories did you read today?," "Which of these streets did you use on your commute today?," "What time did you have your morning coffee this morning?," "Which of the following devices did you use to access your FACEBOOK account today?," "What is the current temperature in your living room?," "What time did your alarm go off this morning?," etc. As explained above, questions like these (in addition to numerous others) may be generated based on the information gathered in step 304.

In examples where generating module 108 creates one or more security questions, generating module 108 may create a policy that prescribes authenticating the user if the user, in response to being presented with the security questions, provides answers that match the designated correct answers. In some examples, generating module 108 may prescribe authenticating the user if the user is able to correctly answer a certain number and/or percentage of the total number of security questions presented to the user. Alternatively, generating module 108 may prescribe authenticating the user, based on his or her answers to the security questions, only if the user correctly answers all of the security questions presented to him or her.

By basing security questions on information 122, generating module 108 may create specific security questions with answers that (1) are known to the user and known to the authentication service, but that (2) are unlikely to be known by an attacker. Also, because the answers to the security questions are based on the day-to-day activities of the user, the answers may be easier for the user to remember than other commonly used shared secrets (e.g., passwords).

In another example, generating module 108 may create a digital fingerprint (such as digital fingerprint 124) that uniquely identifies the user. In some embodiments, generating module 108 may base digital fingerprint 124 on digital device 202 and one or more additional devices with which the user, a network of the user, and/or digital device 202 interacts. Additionally or alternatively, digital fingerprint 124 may encompass digital content accessed by the user, usage patterns of the user (e.g., log-in patterns, connectivity patterns, etc.), network data generated by applications used the user, a location of a digital device, an association between digital devices, etc.

In some examples, generating module 108 may base digital fingerprint 124 on information gathered at a single moment. In other examples, generating module 108 may base digital fingerprint 124 on information gathered over time, accumulated from multiple moments. In some examples, gathering module 106 may continually gather information and generating module 108 may continually update digital fingerprint 124 based on the continually gathered information.

Figure 8:
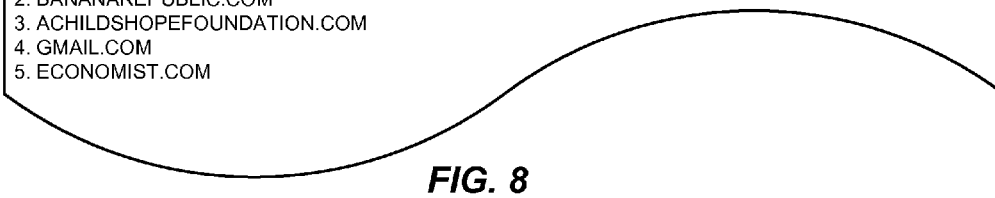
FIG. 8 is an illustration of exemplary information included in a digital fingerprint.

FIG. 8 illustrates a specific example of a digital fingerprint (i.e., digital fingerprint 124) that generating module 108 may create based on information gathered by gathering module 106. In this example, digital fingerprint 124 may include a list of devices which the user was logged onto at a particular time (e.g., Apr. 30, 2015). As shown in FIG. 8, this list may include a DELL laptop, an iPHONE, and a VERIZON tablet. In this example, digital fingerprint 124 may also include a list of the devices connected to a home network of the user at the particular time. As shown in FIG. 8, this list may include a DELL laptop, a VERIZON tablet, a CANNON wireless printer, and an iGRILL wireless cooking thermometer. In this example, digital fingerprint 124 may also include a list of websites visited by the user at the particular time. As shown in FIG. 8, this list may include KEY.COM, BANANAREPUBLIC.COM, ACHILDSHOPEFOUNDATION.COM, and ECONOMIST.COM.

Additionally, digital fingerprint 124 in FIG. 8 may include a list of devices connected to the DELL laptop of the user at the particular time. As shown in FIG. 8, this list may include a PLANTRONICS wireless headset and a CANNON wireless printer. Additionally, as shown in FIG. 8, digital fingerprint 124 may indicate that the GPS coordinates of the DELL laptop, at the particular time, are 47° 42' 09.83"n, 10° 56' 19.47"e.

In examples where generating module 108 creates a digital fingerprint, generating module 108 may create a policy that prescribes authenticating the user if a digital environment of the user at a current moment in time matches the digital fingerprint of the user. For example, using fingerprint 124 as shown in FIG. 8, generating module 108 may create a policy that prescribes authenticating the user if a digital environment of the user at the current moment in time matches digital fingerprint 124.

In some examples, generating module 108 may indicate that the current digital environment matches digital fingerprint 124 based at least in part on a certain number and/or percentage of devices that are connected to the user, a network of the user, and/or a device of the user matching devices within digital fingerprint 124. In examples where digital fingerprint 124 includes associations between a digital device of the user and additional devices, generating module 108 may indicate that the current digital environment of the user matches digital fingerprint 124 based at least in part on the current associations between the digital device and additional devices matching the associations included in digital fingerprint 124.

In examples where digital fingerprint 124 includes information relating to the digital content accessed by the user, the usage patterns of the user, and/or the network data generated by applications used the user, generating module 108 may indicate that the current digital environment of the user matches digital fingerprint 124 based at least in part on the current digital content accessed by the user, current usage patterns of the user, and/or current network data generated by applications used by the user matching the digital content, usage patterns, and network data within digital fingerprint 124. In examples where digital fingerprint 124 includes GPS data for a digital device, generating module 108 may indicate that the current digital environment of the user matches digital fingerprint 124 based additionally on current GPS data from the digital device matching the GPS data for the digital device included in digital fingerprint 124.

By basing authentication protocol 126 on digital fingerprint 124, generating module 108 may create an authentication protocol that is reliable due to its comprehensiveness and both easy and convenient for the user. In some instances, an authentication protocol based on digital fingerprint 124 may altogether bypass a need for a user to input a password or other information in order to be authenticated.

In some examples, generating module 108 may prescribe using authentication protocol 126 as a source of primary authentication. As used herein, the term "primary authentication," generally refers to an authentication protocol that is a sole method of authentication. By way of example, generating module 108 may use authentication protocol 126 as a source of primary authentication by prescribing the use of authentication protocol 126 instead of the use of traditional password methods.

In other examples, generating module 108 may prescribe using authentication protocol 126 as a source of secondary authentication. As used herein, the term "secondary authentication," generally refers to an authentication protocol that is used as a supplement to, or in addition to, another authentication protocol. By way of example, generating module 108 may use authentication protocol 126 as a source of secondary authentication by prescribing the use of authentication protocol 126 in addition to requiring the user to successfully submit a password.

Returning to FIG. 3, at step 308, one or more of the systems described herein may use the authentication protocol to authenticate the user. For example, authentication module 110 may, as part of backend 206 in FIG. 2, use authentication protocol 126 to authenticate the user.

Authentication module 110 may use authentication protocol 126 to authenticate the user in a variety of ways. In some examples (e.g., where authentication module 110 operates as part of a third-party authentication service), authentication module 110 may deliver authentication protocol 126 to an online service that is seeking to authenticate the user (e.g., to enable the online service to authenticate the user using authentication protocol 126). In other examples (e.g., where authentication module 110 operates as part of the service that is seeking to authenticate the user), authentication module 110 may use authentication protocol 126 to authenticate the user directly. In one example (e.g., where authentication module 110 operates as part of the third-party authentication service), authentication module 110 may authenticate the user directly using authentication protocol 126 and then send an authentication notification to the online service (e.g., by sending the online service an SAML assertion that indicates that the user is authenticated).

As discussed above in connection with step 306, in one example, authentication protocol 126 may prescribe authenticating the user if the user successfully answers one or more security questions based on information 122. In these examples, authentication module 110 may present the one or more security questions to the user and receive answers from the user. Upon receiving the answers, authentication module 110 may determine whether the answers received match the correct answers (i.e., whether the answers match those designated as correct by generating module 108).

If authentication module 110 determines that the answers received from the user match the correct answers, authentication module 110 may authenticate the user in response to the determination. Otherwise, if authentication module 110 determines that the answers received from the user do not match the correct answer, authentication module 110 may deny authentication. Additionally or alternatively (e.g., if authentication module 110 determines that the answers received from the user do not match the correct answer), authentication module 110 may require additional action on the part of the user in order to be authenticated. For example, authentication module 110 may require the user to correctly answer one or more additional security questions or may require the user to complete an additional authentication requirement (e.g., call a service associated with authentication module 110 to be authenticated by phone).

In some examples, authentication module 110 may authenticate the user if the user is able to correctly answer a certain number and/or percentage of the total number of security questions presented to the user. Alternatively, authentication module 110 may authenticate the user, based on his or her answers to the security questions, only if the user correctly answers all of the security questions presented to him or her.

In another example, as discussed above in connection with step 306, authentication protocol 126 may prescribe authenticating the user if a current digital environment of the user matches digital fingerprint 124. In this example, authentication module 110 may authenticate the user if the current digital environment of the user matches digital fingerprint 124. As discussed above in connection with step 306, this digital fingerprint may be used as part of a primary authentication method or as part of a secondary authentication method.

As detailed above, authentication module 110 may determine that the current digital environment of the user matches digital fingerprint 124 in a variety of ways. In some examples, authentication module 110 may determine that the current digital environment matches digital fingerprint 124 based on a threshold number and/or percentage of digital devices used by user, connected to a network of the user, and/or connected to a device of the user at a current moment in time matching digital devices included within digital fingerprint 124. Using FIG. 8 as an example, authentication module 110 may determine that the current digital environment of the user matches digital fingerprint 124 based at least in part on (1) a threshold number and/or percentage of digital devices which the user is currently logged onto matching the DELL laptop, the iPHONE, or the VERIZON tablet listed in digital fingerprint 124, (2) a threshold number and/or percentage of digital devices currently connected to the home network matching the DELL laptop, the VERIZON tablet, the CANNON wireless printer, or the iGRILL wireless cooking thermometer listed in digital fingerprint 124, and/or (3) a threshold number and/or percentage of digital devices currently connected to the DELL laptop matching the PLANTRONICS wireless headset or the CANNON wireless printer listed in digital fingerprint 124.

Additionally or alternatively, authentication module 110 may determine that the current digital environment matches digital fingerprint 124 based on current associations between a digital device of the user and additional devices matching the associations included in digital fingerprint 124. For example, authentication module 110 may determine that the current digital environment matches digital fingerprint 124 in FIG. 8 based at least in part on a certain number and/or percentage of current associations between the DELL laptop of the user and additional devices matching the associations of the DELL laptop described in digital fingerprint 124 as shown in FIG. 8.

Additionally or alternatively, authentication module 110 may determine that the current digital environment matches digital fingerprint 124 based on the current digital content accessed by the user, current usage patterns of the user, and/or current network data generated by applications used by the user matching the digital content, usage patterns, and network data within digital fingerprint 124. For example, authentication module 110 may determine that the current digital environment matches digital fingerprint 124 if the websites visited by the user at the current moment in time match the websites described by digital fingerprint 124.

In some examples, authentication module 110 may determine that the websites visited by the user at the current moment in time match the websites described by digital fingerprint 124 if the websites visited by the user at the current moment are similar in kind to the websites described in digital fingerprint 124. Alternatively, authentication module 110 may determine that the websites visited by the user at the current moment in time only match the websites described by digital fingerprint 124 if the websites visited by the user at the current moment are an exact match.

Additionally or alternatively, authentication module 110 may determine that the current digital environment matches digital fingerprint 124 based on current GPS data from the digital device matching the GPS data for the digital device included in digital fingerprint 124. For example, authentication module 110 may determine that the current digital environment of the user matches digital fingerprint 124 in FIG. 8 based at least in part on a current GPS location of the DELL laptop matching the GPS coordinates for the DELL laptop included in digital fingerprint 124. In one example, authentication module 110 may determine that current GPS coordinates match GPS coordinates in digital fingerprint 124 only if the current GPS coordinates are an exact match. In another example, authentication module 110 may determine that the current GPS coordinates match the GPS coordinates in digital fingerprint 124 if the current GPS coordinates are within a predetermined range of the GPS coordinates included in digital fingerprint 124.

In these examples, if authentication module 110 determines that the current digital environment of the user matches digital fingerprint 124, authentication module 110 may authenticate the user. Otherwise, if authentication module 110 determines that the current digital environment of the user does not match digital fingerprint 124, authentication module 110 may require additional action on the part of the user or deny authentication, as discussed above.

As described above, the disclosed systems and methods describe using information about how a user interacts with a digital device as a shared secret between the user and an identity provider. The shared secret may then be used as the basis for an authentication protocol. In some embodiments, the shared secret may be used as the subject matter of the answer to a security question. In this example, the authentication protocol may prescribe authenticating the user if the user successfully answers the security question. In additional or alternative embodiments, information about how a user interacts with a digital device may be used to create a digital fingerprint for the user. In these embodiments, the disclosed systems and methods may authenticate an individual purporting to be the user if his or her digital fingerprint matches the digital user fingerprint.

The information about how a user interacts with a digital device may be obtained in various ways. For example, this information may be obtained from smart-home devices and/or from a router connected to smart-home devices. As another example, the information may be obtained from any device, or application running on a device, that monitors activities of the user and/or that is used by the user and/or that is used in connection with a device of the user. In some examples, this information may also include information that has been aggregated from multiple devices.

Authenticating users based on information about how a user interacts with a digital device may have many advantages. For example, the information about how the user interacts with the digital device may be more difficult for an attacker to surmise than personal data (such as a place of birth) that may be publically available. As such, this information may form a better basis for shared secrets than other, less secure, types of information. Also, an authentication protocol based on this type of information may be easy and convenient for the user being authenticated. For example, such an authentication protocol may require the user to provide information that is easy for the user to recall or, in some embodiments, may not require any overt action on the part of the user.

FIG. 9 is a block diagram of an exemplary computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the exemplary embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910. In one example, database 120 from FIG. 1 may be stored in primary storage device 932.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an Application Specific Integrated Circuit (ASIC) adapted to implement one or more of the exemplary embodiments disclosed herein.

Figure 10:
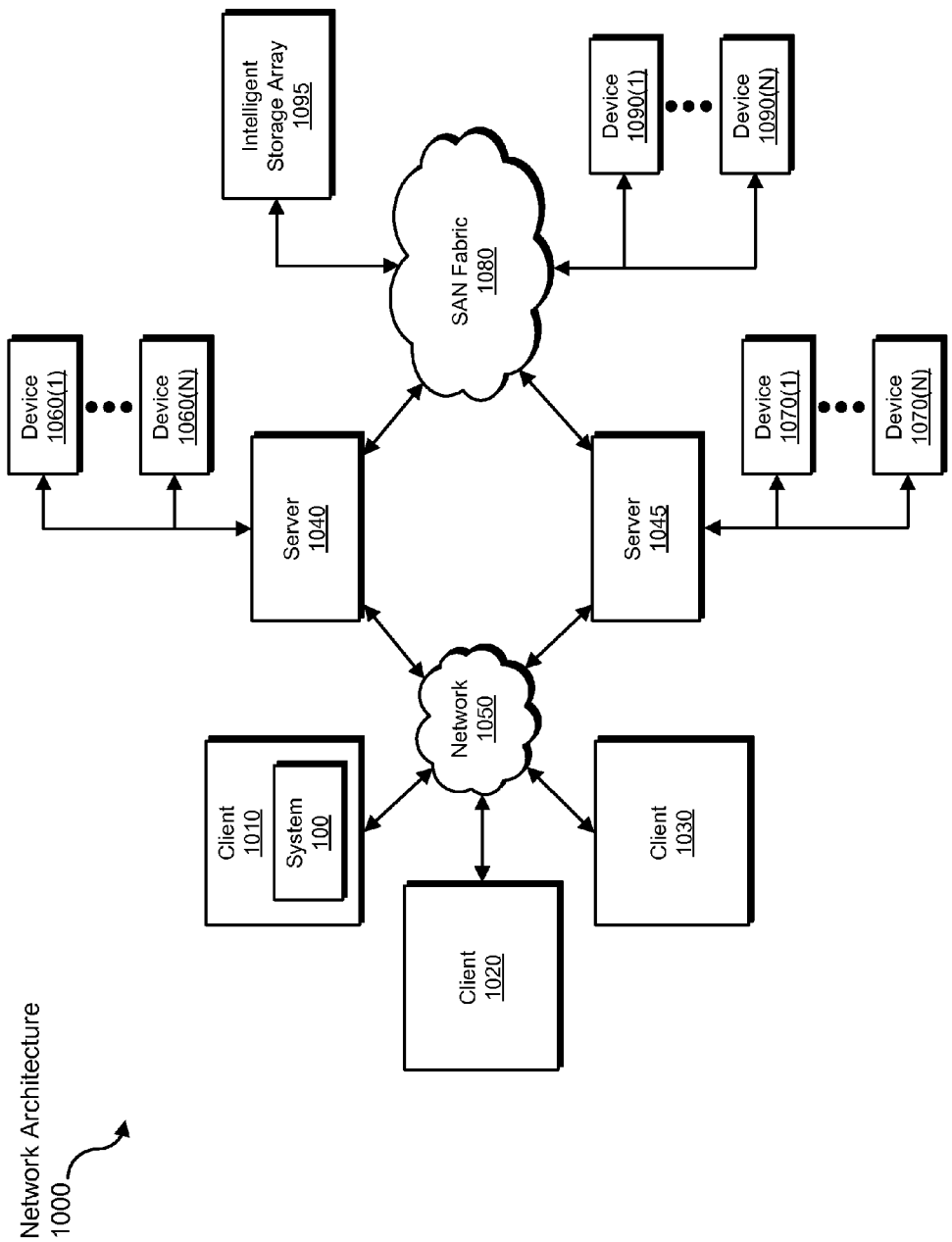
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3). All or a portion of network architecture 1000 may also be used to perform and/or be a means for performing other steps and features set forth in the instant disclosure.

Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-

(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an exemplary method for.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all ora portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information about how a user interacts with a digital device and output an authentication protocol for authenticating the user. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for authenticating users, at least a portion of the method being performed by a computing device comprising at least one processor, the method comprising:
   identifying a constellation of digital devices with which a user interacts by monitoring, via a router that directs traffic on a network connected to the constellation of digital devices, network traffic generated by the constellation of digital devices, wherein the constellation of digital devices comprises a constellation of smart-home appliances;
   creating a digital fingerprint for the user that is based on the constellation of digital devices;
   generating an authentication protocol for authenticating the user by creating a policy that prescribes authenticating the user if a current digital environment of the user matches the digital fingerprint based on at least one of:
      a threshold number of digital devices within the current digital environment of the user matching digital devices included within the digital fingerprint; and
      a threshold percentage of the digital devices within the current digital environment of the user matching the digital devices included within the digital fingerprint; and
   using the authentication protocol to authenticate the user.

2. The computer-implemented method of claim 1, wherein the constellation of digital devices comprises at least one of:
   a computing device;
   a smart appliance; and
   a sensing device.

3. The computer-implemented method of claim 1, wherein the digital devices within the current digital environment of the user comprise at least one of:
   a device used by the user at a current moment in time;
   a device connected to a network of the user at the current moment in time; and
   a device connected to a device of the user at the current moment in time.

4. The computer-implemented method of claim 1, wherein the digital fingerprint encompasses at least one of:
   an association between digital devices within the constellation of digital devices;
   network data generated by at least one digital device within the constellation of digital devices;
   connectivity patterns of the user;
   log-in patterns of the user; and
   digital content accessed by the user.

5. The computer-implemented method of claim 1, wherein the router comprises a smart router.

6. The computer-implemented method of claim 1, wherein using the authentication protocol to authenticate the user comprises automatically authenticating the user based on the current digital environment of the user matching the digital fingerprint without requiring the user to manually input authenticating information.

7. The computer-implemented method of claim 1, wherein identifying the constellation of digital devices comprises:
- identifying a primary digital device of the user;
- identifying a networking device to which the primary digital device is connected; and
- identifying additional devices that are supported by the networking device, wherein the constellation of digital devices comprises the primary digital device of the user and the additional devices.

8. The computer-implemented method of claim 1, wherein using the authentication protocol comprises at least one of:
- using the authentication protocol as part of, and/or providing the authentication protocol to, an identity service; and
- using the authentication protocol as part of, and/or providing the authentication protocol to, an online service.

9. The computer-implemented method of claim 1, wherein using the authentication protocol to authenticate the user comprises determining that the current digital environment of the user matches the digital fingerprint based further on at least one of:
- a certain number of associations between the digital devices within the current digital environment of the user matching associations included in the digital fingerprint;
- a certain percentage of associations between the digital devices within the current digital environment of the user matching associations included in the digital fingerprint;
- current usage patterns of the user matching usage patterns included in the digital fingerprint;
- network data generated by at least one digital device within the current digital environment of the user matching network data generated by at least one digital device within the constellation of digital devices;
- current connectivity patterns of the user matching connectivity patterns included in the digital fingerprint;
- a current log-in pattern of the user matching log-in patterns included in the digital fingerprint; and
- digital content accessed by a digital device in the current digital environment of the user matching digital content included in the digital fingerprint.

10. The computer-implemented method of claim 1, wherein the constellation of digital devices comprises:
- a computing device; and
- an ancillary device that works in tandem with the computing device.

11. The computer-implemented method of claim 10, wherein the ancillary device comprises a Bluetooth device that is used in connection with the computing device.

12. The computer-implemented method of claim 1, wherein the digital fingerprint is further based on at least one of:
- network activity of the user; and
- the location of at least one of the digital devices within the constellation of digital devices.

13. A system for authenticating users, the system comprising:
- an identification module, stored in memory, that identifies a constellation of digital devices with which a user interacts by monitoring, via a router that directs traffic on a network connected to the constellation of digital devices, network traffic generated by the constellation of digital devices, wherein the constellation of digital devices comprises a constellation of smart-home appliances;
- a generation module, stored in memory, that:
  - creates a digital fingerprint for the user that is based on the constellation of digital devices; and
  - generates an authentication protocol for authenticating the user by creating a policy that prescribes authenticating the user if a current digital environment of the user matches the digital fingerprint based on at least one of:
    - a threshold number of digital devices within the current digital environment of the user matching digital devices included within the digital fingerprint; and
    - a threshold percentage of the digital devices within the current digital environment of the user matching the digital devices included within the digital fingerprint;
- an using module, stored in memory, that uses the authentication protocol to authenticate the user; and
- at least one physical processor configured to execute the identification module, the generation module, and the using module.

14. The system of claim 13, wherein the constellation of digital devices comprises at least one of:
- a computing device;
- a smart appliance; and
- a sensing device.

15. The system of claim 13, wherein the identification module identifies the constellation of digital devices by identifying digital devices within the constellation of digital devices based on one or more device characteristics, the one or more device characteristics comprising:
- a MAC address;
- an IP address;
- a manufacturer name;
- a device brand; and
- a device version.

16. The system of claim 13, wherein the router comprises a smart router.

17. The system of claim 16, wherein the constellation of digital devices comprises:
- a computing device; and
- an ancillary device that works in tandem with the computing device.

18. The system of claim 13, wherein the digital fingerprint encompasses at least one of:
- an association between digital devices within the constellation of digital devices;
- network data generated by at least one digital device within the constellation of digital devices;
- connectivity patterns of the user;
- log-in patterns of the user; and
- digital content accessed by the user.

19. The system of claim 13, wherein the using module uses the authentication protocol to authenticate the user by automatically authenticating the user based on the current digital environment of the user matching the digital fingerprint without requiring the user to manually input authenticating information.

20. A non-transitory computer-readable medium comprising one or more computer-readable instructions that, when executed by at least one processor of a computing device, cause the computing device to:
- identify a constellation of digital devices with which a user interacts by monitoring, via a router that directs traffic on a network connected to the constellation of digital devices, network traffic generated by the constellation of digital devices, wherein the constellation of digital devices comprises a constellation of smart-home appliances;

create a digital fingerprint for the user that is based on the constellation of digital devices;

generate an authentication protocol for authenticating the user by creating a policy that prescribes authenticating the user if a current digital environment of the user matches the digital fingerprint based on at least one of:
  a threshold number of digital devices within the current digital environment of the user matching digital devices included within the digital fingerprint; and
  a threshold percentage of the digital devices within the current digital environment of the user matching the digital devices included within the digital fingerprint; and use the authentication protocol to authenticate the user.

* * * * *